United States Patent
Aichi (10) Patent No.: US 10,962,853 B1
(45) Date of Patent: Mar. 30, 2021

(54) DISPLAY SUBSTRATE AND DISPLAY DEVICE

(71) Applicant: Sharp Kabushiki Kaisha, Sakai (JP)

(72) Inventor: Hiroshi Aichi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 52 days.

(21) Appl. No.: 16/603,285

(22) PCT Filed: Apr. 4, 2018

(86) PCT No.: PCT/JP2018/014379
§ 371 (c)(1),
(2) Date: Oct. 7, 2019

(87) PCT Pub. No.: WO2018/190214
PCT Pub. Date: Oct. 18, 2018

(30) Foreign Application Priority Data

Apr. 11, 2017 (JP) .............................. JP2017-078217

(51) Int. Cl.
*G02F 1/1345* (2006.01)
*G06F 3/044* (2006.01)
*G02F 1/1368* (2006.01)
*G02F 1/1362* (2006.01)
*G02F 1/1333* (2006.01)

(52) U.S. Cl.
CPC .......... *G02F 1/1368* (2013.01); *G02F 1/1345* (2013.01); *G02F 1/13338* (2013.01); *G02F 1/136286* (2013.01); *G06F 3/0443* (2019.05); *G06F 3/0447* (2019.05)

(58) Field of Classification Search
CPC ............... G02F 1/1345; G02F 1/13458; G02F 1/134372; G02F 2001/13685; G06F 3/0443; G06F 3/0447
See application file for complete search history.

(56) References Cited

U.S. PATENT DOCUMENTS

| | | |
|---|---|---|
| 2015/0177880 A1 | 6/2015 | Shin et al. |
| 2015/0301639 A1 | 10/2015 | Shin et al. |
| 2015/0364507 A1* | 12/2015 | Won .................. G06F 3/0412 257/43 |
| 2016/0012766 A1 | 1/2016 | Shin et al. |

FOREIGN PATENT DOCUMENTS

JP    2015-122057 A    7/2015

* cited by examiner

*Primary Examiner* — Angela K Davison
(74) *Attorney, Agent, or Firm* — Keating & Bennett, LLP (57) ABSTRACT

A display substrate includes: a switching element including a pixel connection electrode composed of a first conductive film; a pixel electrode composed of a third conductive film and including a portion overlapping the pixel connection electrode; a pixel contact hole drilled through first, second, and third insulating films at a position overlapping the pixel connection electrode and the pixel electrode; a wiring composed of a second conductive film; a wiring connection portion including a portion overlapping the wiring; a first wiring contact hole drilled through the third insulating film at a position overlapping the wiring and the wiring connection portion; a lead-out wiring including a portion overlapping a section of the wiring connection portion not overlapping the wiring; and a second wiring contact hole drilled through the first to the third insulating films at a position overlapping the wiring connection portion and the lead-out wiring.

8 Claims, 5 Drawing Sheets

DISPLAY SUBSTRATE AND DISPLAY DEVICE

TECHNICAL FIELD

The present invention relates to a display substrate and a display device.

BACKGROUND ART

Conventionally, as one example of a touchscreen panel integrated display device in which a touchscreen panel is of an in-cell type and is contained in a display panel, a touchscreen panel integrated display device described in PTL 1, described below, has been known. The touchscreen panel integrated display device described in PTL 1 includes a panel in which a plurality of data lines are formed in a first direction, a plurality of gate lines are formed in a second direction, and a plurality of electrodes to be grouped into a plurality of electrode groups are formed, a touch integrated circuit that applies a touch driving signal to all or some of the plurality of electrodes when a driving mode is a touch driving mode, a data driver that supplies a data voltage to the plurality of data lines when the driving mode is a display driving mode, and a gate driver that sequentially supplies a scan signal to the plurality of gate lines when the driving mode is the display driving mode, in which a touch driving signal or a signal corresponding to the touch driving signal is applied to all or some of the plurality of gate lines when the driving mode is the touch driving mode.

RELATED ART DOCUMENT

Patent Document
  Patent Document 1: Japanese Unexamined Patent Application Publication No. 2015-122057

Problem to be Solved by the Invention

In the touchscreen panel integrated display device described in Patent Document 1, described above, a signal line to which a touch driving signal related to touch detection is fed is composed of a metal film disposed on the further upper layer side of a first protective layer disposed on the upper layer side of the data line to be supplied with a data voltage related to image display. When a metal film is patterned to form a signal line in a production process, a dry etching method may be used in addition to a wet etching method. When the dry etching method is used, a portion, not overlapping the signal line, in the first protective layer may be etched. Therefore, an insulating film may be interposed as an etching stopper between the first protective layer and the metal film. When such an insulating film is added, a dedicated photomask may be required to pattern the insulating film when the signal line is connected to a metal film or the like on the lower layer side with respect to the signal line. Consequently, a production cost may be increased.

DISCLOSURE OF THE PRESENT INVENTION

The present invention was made in view of the above circumstances. An object is to reduce a production cost.

Means for Solving the Problem

A display substrate according to the present invention includes: a first conductive film; a first insulating film disposed on an upper layer side of the first conductive film; a second insulating film disposed on an upper layer side of the first insulating film; a second conductive film disposed on an upper layer side of the second insulating film; a third insulating film disposed on an upper layer side of the second conductive film; a third conductive film disposed on an upper layer side of the third insulating film; a switching element including at least a pixel connection electrode composed of the first conductive film; a pixel electrode composed of the third conductive film and including a portion overlapping at least a portion of the pixel connection electrode; a pixel contact hole drilled through the first insulating film, the second insulating film, and the third insulating film at a position overlapping the pixel connection electrode and the pixel electrode; a wiring composed of the second conductive film; a wiring connection portion composed of the third conductive film and including a portion overlapping a portion of the wiring; a first wiring contact hole drilled through the third insulating film at a position overlapping the wiring and the wiring connection portion; a lead-out wiring composed of the first conductive film and including a portion overlapping a section of the wiring connection portion not overlapping the wiring; and a second wiring contact hole drilled through the first insulating film, the second insulating film, and the third insulating film at a position overlapping the wiring connection portion and the lead-out wiring.

According to the configuration, because the second insulating film is disposed between the first insulating film and the second conductive film, the second insulating film can be used as an etching stopper for the first insulating film during patterning of the second conductive film by the dry etching method. On the other hand, when the wiring composed of the second conductive film and the lead-out wiring composed of the first conductive film are connected to each other, if a configuration in which a portion of the wiring and a portion of the lead-out wiring are made to overlap each other and a contact hole is drilled through the first insulating film and the second insulating film at the overlapping position to directly connect the wiring and the lead-out wiring has been adopted, a dedicated photomask for patterning the second insulating film is required so that a production cost may be increased.

According to the configuration, the portion of the wiring connection portion composed of the third conductive film overlaps the portion of the wiring composed of the second conductive film while the section of the wiring connection portion not overlapping the wiring overlaps the portion of the lead-out wiring composed of the first conductive film. Furthermore, the first wiring contact hole is drilled through the third insulating film at the position overlapping the wiring and the wiring connection portion and the second wiring contact holes are drilled through the first insulating film, the second insulating film, and the third insulating film at the position overlapping the wiring connection portion and the lead-out wiring. Therefore, the wiring and the lead-out wiring are connected to each other via the wiring connection portion. Furthermore, the configuration does not include a contact hole that is not drilled through the third insulating film but drilled through the first insulating film and the second insulating film. That is, the first wiring constant hole and the second wiring contact holes drilled through the third insulating film. This is in common with the pixel contact holes drilled through the first insulating film, the second insulating film, and the third insulating film at the position overlapping at least the portion of the pixel connection electrode composed of the first conductive film in the switching element and the portion of the pixel electrode composed of the third conductive film. Therefore, the first wiring contact hole and the second wiring contact holes can be formed using a photomask used to form the pixel contact holes. As described above, the pixel contact holes, the first wiring contact hole, and the second wiring contact holes can be formed using a photomask for patterning the third insulating film, and a dedicated photomask for patterning the second insulating film is not required, which is suitable for reducing a production cost. The portion of the wiring composed of the second conductive film is disposed at a position overlapping the first wiring constant hole, and the wiring functions as an etching stopper for the first insulating film and the second insulating film.

As aspects of the present invention, the following configurations are preferable.

(1) The display substrate includes: a fourth insulating film disposed on an upper layer side of the third conductive film; a fourth conductive film disposed on an upper layer side of the fourth insulating film; a position detection electrode composed of the fourth conductive film and including a portion overlapping a portion of the wiring, the position detection electrode being configured to form an electrostatic capacitance between a position input member for performing position input and the position detection electrode for detection of a position of input by the position input member; and a position detection contact hole drilled through the third insulating film and the fourth insulating film at a position overlapping the position detection electrode and the wiring. According to the configuration, the portion of the position detection electrode composed of the fourth conductive film overlaps the portion of the wiring composed of the second conductive film. Furthermore the overlapping portions are connected to each other via the position detection contact holes drilled through the third insulating film and the fourth insulating film. Therefore, the position detection electrode forms the electrostatic capacitance between the position input member for performing position input and itself so that the position of input by the position input member can be detected using a signal to be fed by the wiring.

(2) The display substrate includes a pad electrode composed of the third conductive film and disposed to overlap the position detection contact holes. According to the configuration, the overlapping portions of the position detection electrode composed of the fourth conductive film and the wiring composed of the second conductive film are connected to the pad electrode composed of the third conductive film via the position detection contact holes drilled through the third insulating film and the fourth insulating film. That is, the pad electrode is disposed between the position detection electrode and the wiring. Therefore, a step that can occur in the position detection electrode is more reduced and thus a connection state between the position detection electrode and the wiring becomes better than when a configuration in which the position detection electrode is directly connected to the wiring has been adopted.

(3) The display substrate includes: a terminal disposed at an end of the lead-out wiring on an opposite side to a side of the wiring connection portion; a terminal hole drilled through the first insulating film, the second insulating film, and the third insulating film at a position overlapping at least the terminal; and a terminal overlapping portion composed of the third conductive film and disposed to overlap the terminal. According to the configuration, the terminal overlapping portion composed of the third conductive film is connected to the terminal at the end of the lead-out wiring on the opposite side to the side of the wiring connection portion via the terminal hole drilled through the first insulating film, the second insulating film, and the third insulating film at the position overlapping at least the terminal. If the terminal overlapping portion is not formed, the terminal is exposed via the terminal hole. Therefore, the terminal may be etched when the third conductive film is patterned. According to the configuration, the terminal overlapping portion is connected to the terminal via the terminal hole. Therefore, the terminal can be protected by the terminal overlapping portion when the third conductive film is patterned, and the terminal can be avoided being etched while the resistance of the terminal can be reduced.

(4) The display substrate includes: a fourth insulating film disposed on the upper layer side of the third conductive film; a fourth conductive film disposed on an upper layer side of the fourth insulating film; a second terminal overlapping portion composed of the fourth conductive film and disposed to overlap the terminal overlapping portion; and a second terminal hole drilled through the forth insulating film at a position overlapping the terminal overlapping portion and the second terminal overlapping portion. According to the configuration, the second terminal overlapping portion composed of the fourth conductive film is connected to the terminal overlapping portion composed of the third conductive film via the second terminal hole in the fourth insulating film. The terminal can be further protected by the second terminal overlapping portion while the resistance of the terminal can be further reduced.

(5) The terminal includes a first terminal portion at the end of the lead-out wiring on an opposite side to the wiring connection portion and a second terminal portion composed of the second conductive film, disposed to overlap the first terminal portion, and connected to the first terminal portion via the terminal hole. According to the configuration, the resistance of the terminal can be further reduced because the first terminal portion composed of the first conductive film and the second terminal portion composed of the second conductive film constitute the terminal.

(6) The display substrate includes: a fourth insulating film disposed on an upper layer side of the third conductive film; a fourth conductive film disposed on an upper layer side of the fourth insulating film; a wiring connection overlapping portion composed of the fourth conductive film and including a portion disposed to overlap the wiring connection portion; and a third wiring contact hole drilled through the fourth insulating film at a position overlapping the wiring connection portion and the wiring connection overlapping portion. According to the configuration, the wiring connection overlapping portion composed of the fourth conductive film includes a section connected to the wiring connection portion composed of the third conductive film via the third wiring contact hole in the fourth insulating film. The resistance of the wiring connection portion is reduced by the wiring connection overlapping portion while the wiring connection portion is not easily corroded.

To solve the above-described problems, a display device according to the present invention includes the display substrate described above and a common substrate opposed to the display substrate with an interior space between the display substrate and the common substrate. According to the display device having such a configuration, the production cost of the display substrate is reduced so that excellent cost competitiveness is obtained.

Advantageous Effect of the Invention

According to the present invention, a production cost can be reduced.

MODES FOR CARRYING OUT THE INVENTION

First Embodiment

Figure 3:
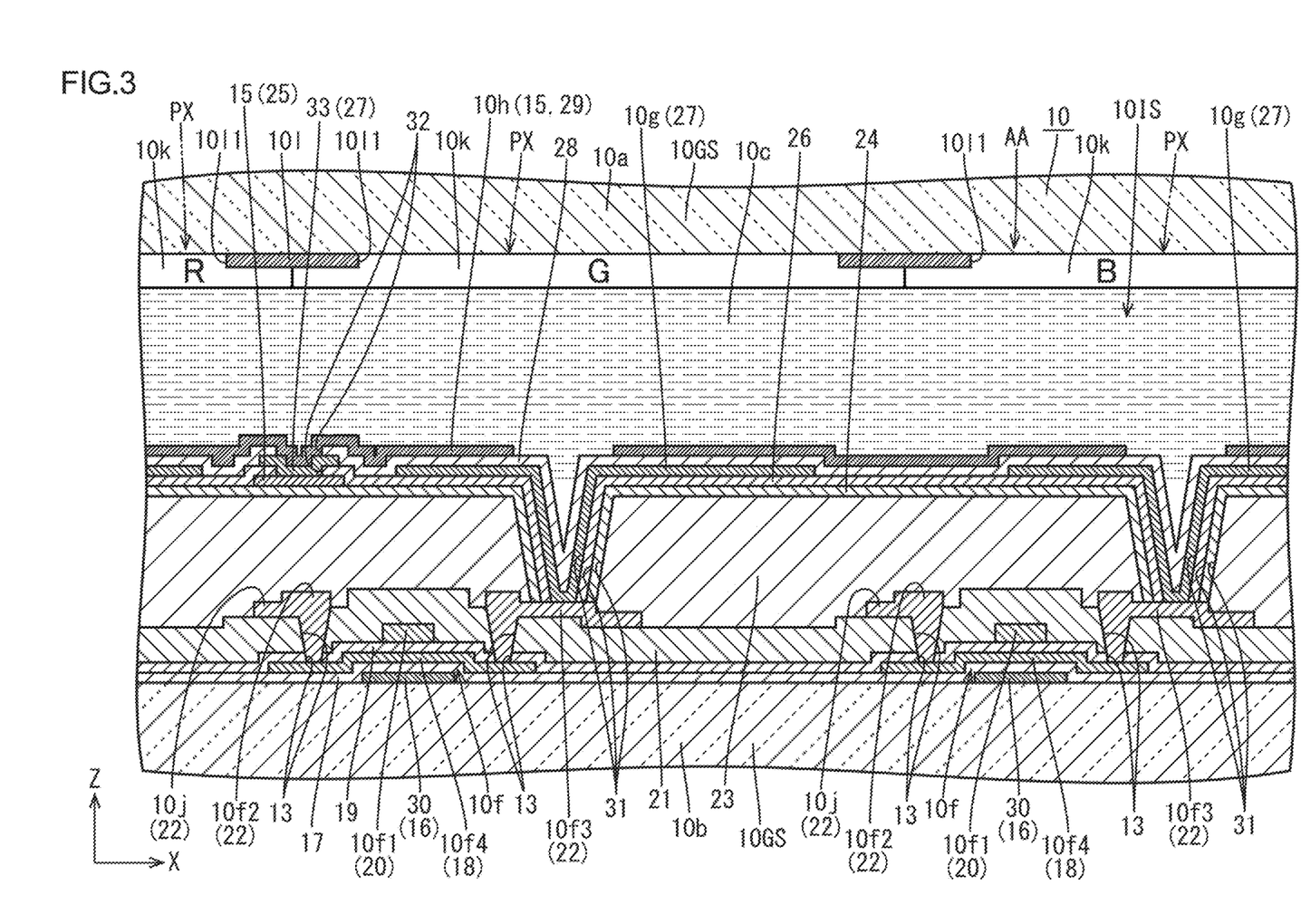
FIG. 3 is a cross-sectional view taken along line A-A in FIG. 2.
Figure 4:
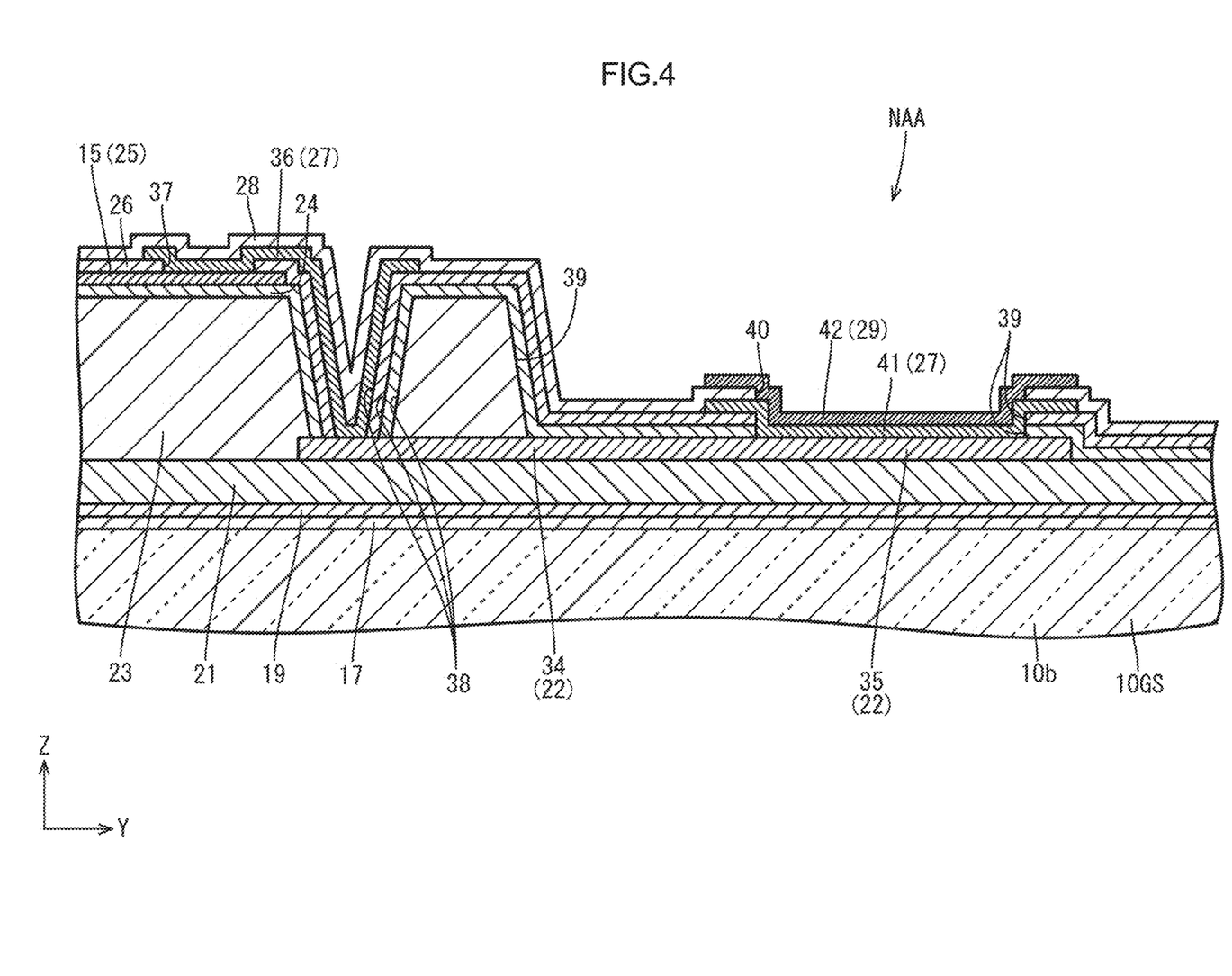
FIG. 4 is a cross-sectional view illustrating a connection portion between the touch wiring and a touch lead-out wiring in the array substrate.

A first embodiment of the present invention will be described with reference to FIG. 1 to FIG. 4. In the present embodiment, a liquid crystal panel (a display device or a display device with a position input function) 10 including a touchscreen panel function (position input function) in addition to a display function will be illustrated as an example. An X-axis, a Y-axis, and a Z-axis are illustrated in a part of each of the drawings, and are drawn such that a direction along each of the axes is a direction illustrated in the drawing. For an up-and-down direction, FIG. 3 and FIG. 4 are used as a reference, and the upper side and the lower side in the drawings are respectively set as a front side and a rear side.

The liquid crystal panel 10 displays an image using illumination light irradiated from a backlight device (lighting device) not illustrated. The liquid crystal panel 10 includes at least a pair of substrates 10a and 10b made of glass being substantially transparent and excellent in translucency, and a liquid crystal layer 10c including liquid crystal molecules as a substance that is disposed in an interior space 10IS included between plate surfaces, opposing each other, in both the substrates 10a and 10b and changes in optical characteristic with application of an electric field, and the liquid crystal layer 10c (the interior space 10IS) is surrounded by a sealant (not illustrated) interposed between the pair of substrates 10a and 10b to achieve sealing. In the pair of substrates 10a and 10b constituting the liquid crystal panel 10, the substrate on the front side (front surface side) is set as a CF substrate (a common substrate) 10a, and the substrate on the rear side (back surface side) is set as an array substrate (a display substrate or an active matrix substrate) 10b. Both the CF substrate 10a and the array substrate 10b are formed by stacking various types of films on an inner surface side of the glass substrate (substrate) 10GS. Polarizing plates not illustrated are respectively attached to outer surface sides of both the substrates 10a and 10b.

In the liquid crystal panel 10, a central side portion of a screen surrounded by the sealant is a display region AA where an image is displayed (a range surrounded by a one-dot and dash line in FIG. 1) while a frame-shaped outer peripheral portion surrounding the display region AA on the screen is a non-display region NAA where an image is not displayed. The array substrate 10b constituting the liquid crystal panel 10 is larger in size than the CF substrate 10a, a portion of the array substrate 10b protrudes sideward with respect to the CF substrate 10a, and a driver (a driving circuit) 11 and a flexible substrate (a signal transmitting member) 12 are each mounted as a component for feeding various types of signals related to a display function and a touchscreen panel function on the protruding portion (the non-display region NAA). The driver 11 is composed of an LSI chip having a driving circuit in its inner part, is COG (chip on glass) mounted on the above-described protruding portion as the non-display region NAA in the array substrate 10b (a position closer to the display region AA than the flexible substrate 12), and is used for processing various types of signals to be transmitted by the flexible substrate 12. The flexible substrate 12 is configured such that a large number of wiring patterns (not illustrated) are formed on a base material composed of a synthetic resin material (e.g., polyimide-based resin) having an insulating property and flexibility, and one end side and the other end side of the flexible substrate 12 are respectively connected to the above-described protruding portion (an end position with the driver 11 interposed between the display region AA and itself) of the array substrate 10b and a control substrate (a signal supply source) not illustrated. Various types of signals to be fed from the control substrate are transmitted to the liquid crystal panel 10 via the flexible substrate 12, and are outputted toward the display region AA via the processing by the driver 11 in the non-display region NAA.

Figure 2:
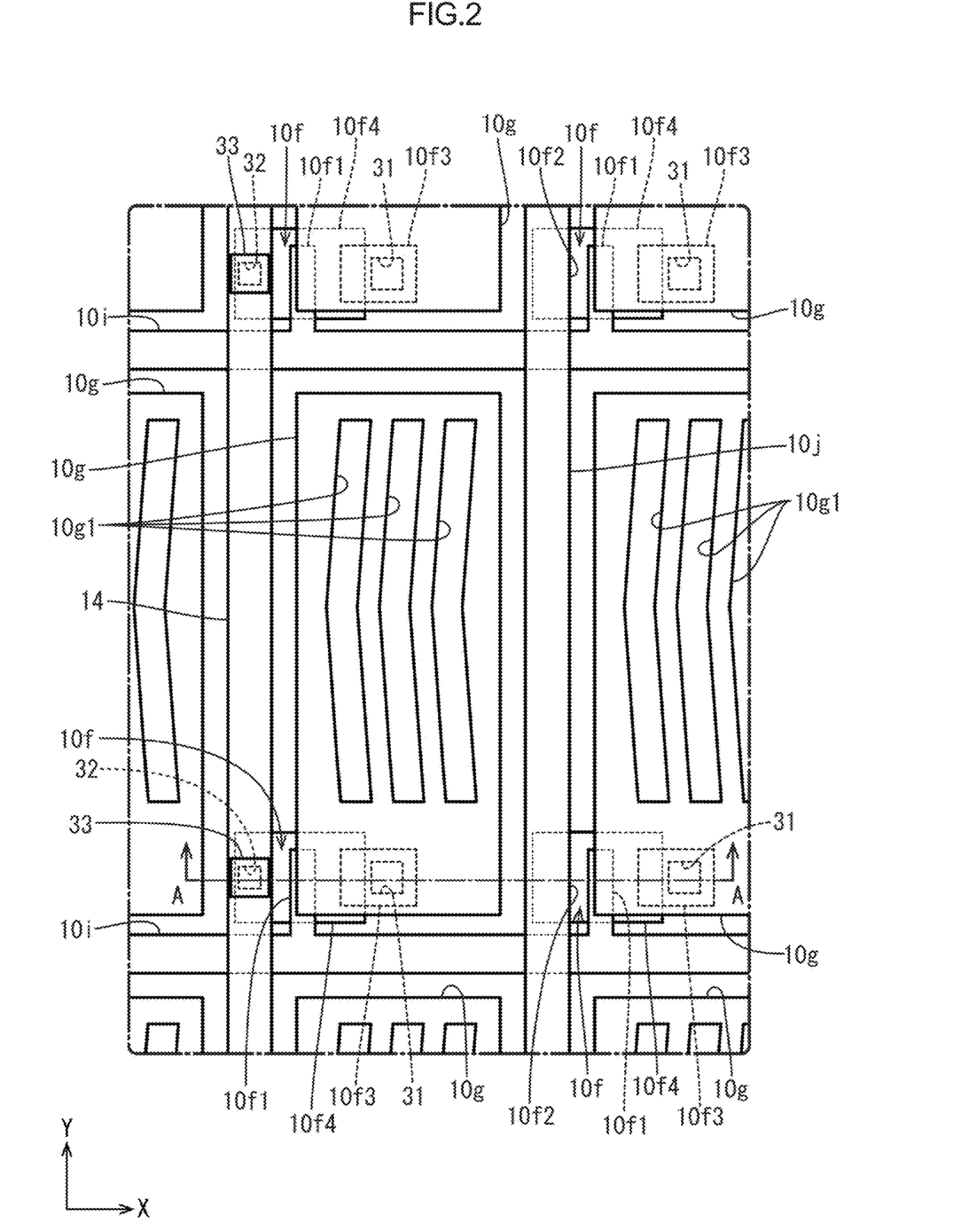
FIG. 2 is a plan view illustrating a pixel array of an array substrate constituting the liquid crystal panel.

Respective multiple numbers of TFTs (thin film transistors or switching elements) 10f and pixel electrodes 10g are provided in a matrix shape side by side in an X-axis direction and a Y-axis direction, as illustrated in FIG. 2, on the inner surface side in the display region AA in the array substrate 10b (the side of the liquid crystal layer 10c or the side of a surface opposing the CF substrate 10a) while gate lines (scanning wirings) 10i and source lines 10j (signal wirings or data wirings) 10j that form a substantially lattice shape are disposed to surround the TFTs 10f and the pixel electrodes 10g. The gate line 10i extends substantially straight in the X-axis direction while the source line 10j extends substantially straight in the Y-axis direction. The gate line 10i and the source line 10j are respectively connected to a gate electrode 10f1 and a source electrode 10f2 of the TFT 10f, and the pixel electrode 10g is connected to a drain electrode (pixel connection electrode) 10f3 of the TFT 10f. The TFT 10f is driven based on various types of signals to be fed to each of the gate line 10i and the source line 10j, and supply of a potential to the pixel electrode 10g is controlled with the driving. The pixel electrode 10g is in a vertically long, substantially square shape as a planar shape, and the source line 10j and the gate line 10i are respectively interposed between the pixel electrode 10g and the pixel electrode 10g adjacent thereto in its short side direction (the X-axis direction) and between the pixel electrode 10g and the pixel electrode 10g adjacent thereto in its long side direction (the Y-axis direction).

A common electrode 10h is formed on the upper layer side with respect to the pixel electrodes 10g (the side closer to the liquid crystal layer 10c) in a form overlapping all the pixel electrodes 10g in a planar view, as illustrated in FIG. 3, on the inner surface side in the display region AA in the array substrate 10b. The common electrode 10h is supplied with a substantially constant reference potential, and extends over a substantially entire area of the display region AA. A plurality of (three in FIG. 2) orientation control holes (pixel overlapping slits or orientation control slits) 10g1 are formed to open in each of the pixel electrodes 10g overlapping the common electrode 10h in a planar view. When a potential difference occurs as the pixel electrode 10g is changed between the pixel electrode 10g and the common electrode 10h that overlap each other, a fringe electric field (oblique electric field) including a component in a normal direction to the plate surface of the array substrate 10b occurs in addition to a component along the plate surface of the array substrate 10b between an opening edge of the orientation control hole 10g1 in the pixel electrode 10g and the common electrode 10h. Therefore, an orientation state of the liquid crystal molecules included in the liquid crystal layer 10c can be controlled using the fringe electric field. In other words, in the liquid crystal panel 10 according to the present embodiment, an operation mode is set to an FFS (fringe field switching) mode. Illustration of the common electrode 10h is omitted in FIG. 2.

Color filters 10k respectively having three colors exhibiting red (R), green (G), and blue (B) are provided, as illustrated in FIG. 3, in the display region AA on the inner surface side of the CF substrate 10a. A large number of color filters 10k respectively exhibiting different colors are arranged in a stripe shape as a whole by being repeatedly arranged along the gate line 10i (in the X-axis direction) while extending along the source line 10j (in the Y-axis direction). The color filters 10k are arranged to respectively overlap the pixel electrodes 10g on the side of the array substrate 10b in a planar view. The color filters 10k adjacent to one another in the X-axis direction and respectively exhibiting different colors are arranged with their boundaries (color boundaries) overlapping the source line 10j and a light shielding portion 101, described below, in a planar view. In the liquid crystal panel 10, the color filters 10k in R, G, and B colors arranged in the X-axis direction and the three pixel electrodes 10g opposing the color filters 10k respectively constitute pixels PX in three colors. In the liquid crystal panel 10, the pixels PX in three R, G, and B colors adjacent to one another in the X-axis direction constitute a display pixel capable of performing color display at a predetermined gray level. An array pitch in the X-axis direction in the pixels PX is approximately tens of micrometers, for example.

The light shielding portion (a pixel-to-pixel light shielding portion or a black matrix) 101 that blocks light is formed, as illustrated in FIG. 3, in the display region AA on the inner surface side of the CF substrate 10a. The light shielding portion 101 has a substantially lattice shape as a planar shape to separate the adjacent pixels PX (the pixel electrodes 10g) and includes pixel holes 1011, respectively, at positions overlapping a large part of the pixel electrode 10g on the side of the array substrate 10b in a planar view. A large number of pixel holes 1011 are disposed side by side in a matrix shape in each of the X-axis direction and the Y-axis direction within the plate surface of the CF substrate 10a. The pixel hole 1011 can transmit light. As a result, display in the pixels PX can be performed. The light shielding portion 101 functions to ensure independence of a gray level of each of the pixels PX by preventing light from traveling between the adjacent pixels PX. Particularly, a portion extending along the source line 10j prevents the pixels PX respectively exhibiting different colors from being color-mixed. The light shielding portion 101 is arranged to overlap the gate line 10i and the source line 10j on the side of the array substrate 10b in a planar view. Orientation films (not illustrated) for orienting the liquid crystal molecules included in the liquid crystal layer 10c are respectively formed on innermost surfaces, contacting the liquid crystal layer 10c, of both the substrates 10a and 10b.

The liquid crystal panel 10 according to the present embodiment has both a display function for displaying an image and a touchscreen panel function (position input function) for detecting a position to be inputted (input position) by a user based on the image to be displayed, and integrates a touchscreen panel pattern for exhibiting the touchscreen panel function out of them (as an in-cell touchscreen panel pattern). The touchscreen panel pattern is of a so-called projected capacitive type, and its detection type is a self-capacitance type. The touchscreen panel pattern is provided on the side of the array substrate 10b in the pair of substrates 10a and 10b, and includes a plurality of touch electrodes (position detection electrodes) 14 disposed side by side in a matrix shape within the plate surface of the array substrate 10b. The touch electrodes 14 are disposed in the display region AA in the array substrate 10b. Therefore, the display region AA in the liquid crystal panel 10 substantially matches a touch region (position input region) where the input position is detectable, and the non-display region NAA substantially matches a non-touch region (non-position input region) where the input position is undetectable. When a finger (a position input member) not illustrated as a conductor is brought closer to a surface (display surface) of the liquid crystal panel 10 in an attempt to perform position input based on the image in the display region AA in the liquid crystal panel 10 to be visually recognized by the user, an electrostatic capacitance is formed between the finger and the touch electrode 14. As a result, a change occurs in the electrostatic capacitance to be detected in the touch electrode 14 close to the finger as the finger comes closer to the display surface, and the electrostatic capacitance differs from that detected in the touch electrode 14 far from the finger. Therefore, the input position can be detected based on the electrostatic capacitance.

Figure 1:
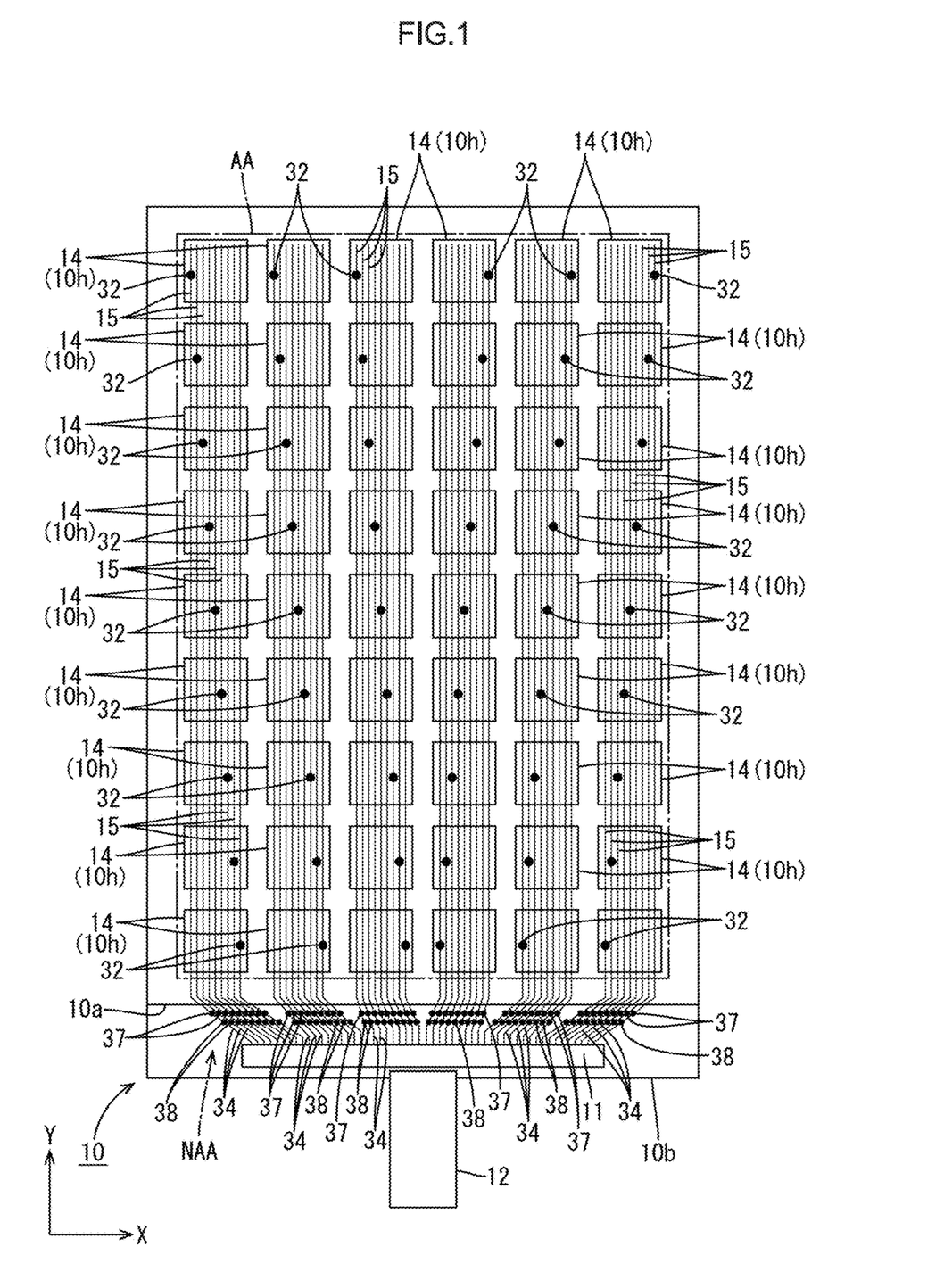
FIG. 1 is a plan view illustrating a planar arrangement of touch electrodes and touch wirings in a liquid crystal panel provided in a liquid crystal display device according to a first embodiment of the present invention.

The touch electrode 14 is composed of the common electrode 10h provided in the array substrate 10b, as illustrated in FIG. 1. The common electrode 10h includes the plurality of touch electrodes 14 electrically independent of one another by being partitioned in a substantially lattice shape to be divided like a grid in a planar view. The plurality of touch electrodes 14 obtained by partitioning the common electrode 10h are disposed side by side in a matrix shape in each of the X-axis direction and the Y-axis direction in the display region AA. The touch electrode 14 has a square shape in a planar view, and a size of its one side is approximately several millimeters (e.g., approximately 2 to 5 millimeters). Therefore, a size in a planar view of the touch electrode 14 is much larger than that of the pixel PX (the pixel electrode 10g). The touch electrode 14 is arranged in a range extending over the plurality of (e.g., approximately tens of or hundreds of) pixels PX in each of the X-axis direction and the Y-axis direction. The plurality of touch wirings (wirings or position detection wirings) 15 provided in the array substrate 10b are selectively connected to the plurality of touch electrodes 14. The touch wiring 15 extends in the Y-axis direction in a form in parallel with the source line 10j in the array substrate 10b, and is selectively connected to the specific touch electrode 14 among the plurality of touch electrodes 14 arranged in the Y-axis direction. Further, the touch wiring 15 is connected to a detection circuit (not illustrated). Although the detection circuit may be provided in the driver 11, the detection circuit may be provided outside the liquid crystal panel 10 with the flexible substrate 12 interposed therebetween. The touch wiring 15 feeds a reference potential signal related to a display function and a touch signal (position detection signal) related to a touch function to the touch electrode 14, respectively, at different timings. The reference potential signal out of them is transmitted to all the touch wirings 15 at the same timing so that all the touch electrodes 14 each have a reference potential to function as the common electrode 10h. FIG. 1 schematically illustrates an array of the touch electrodes 14. A specific number and arrangement of touch electrodes 14 to be installed are not limited to those illustrated in the drawing, but may be appropriately changed.

Various types of films formed to be stacked on the inner surface side of the array substrate 10b will be described below. On the glass substrate 10GS constituting the array substrate 10b, a first metal film (light shielding film) 16, a first interlayer insulating film 17, a semiconductor film 18, a gate insulating film 19, a second metal film (gate metal film) 20, a second interlayer insulating film 21, a third metal film (first conductive film) 22, a flattening film (first insulating film) 23, a third interlayer insulating film (second insulating film) 24, a fourth metal film (second conductive film) 25, a fourth interlayer insulating film (third insulating film) 26, a first transparent electrode film (third conductive film) 27, a fifth interlayer insulating film (fourth insulating film) 28, and a second transparent electrode film (fourth conductive film) 29 are formed to be stacked in this order from the lower layer side (the side of the glass substrate 10GS), as illustrated in FIG. 3.

Each of the first metal film 16, the second metal film 20, the third metal film 22, and the fourth metal film 25 has a conductive property and a light shielding property by being set as a single layer film composed of one type of metal material selected from among copper, titanium, aluminum, and the like or a stacked film or an alloy composed of different types of metal materials, and is disposed in the display region AA and the non-display region NAA. Among them, the first metal film 16 composes a TFT light shielding portion 30, described below. The second metal film 20 composes the gate line 10i, the gate electrode 10/1 of the TFT 10f, and the like. The third metal film 22 composes the source line 10j, the source electrode 10/2 of the TFT 10f, and the drain electrode 10/3, a touch lead-out wiring 34 (including a terminal 35) described below, and the like. The fourth metal film 25 composes the touch wiring 15 and the like. The first interlayer insulating film 17, the gate insulating film 19, the second interlayer insulating film 21, the third interlayer insulating film 24, the fourth interlayer insulating film 26, and the fifth interlayer insulating film 28 are each composed of an inorganic material such as silicon nitride ($SiN_x$) or silicon oxide ($SiO_2$), and keep the metal films 16, 20, 22, and 25, the semiconductor film 18, and the transparent electrode films 27 and that vertically overlap themselves, respectively, in an insulated state. Each of the insulating films 17, 19, 21, 24, 26, and 28 composed of an inorganic material is disposed in a form extending over both the display region AA and the non-display region NAA while the film thickness of the insulating film is preferably made smaller than that of the flattening film 23, described below, e.g., approximately 0.2 μm to 0.3 μm. However, the present invention is not limited to this. The flattening film 23 is composed of an organic material such as acrylic resin (e.g., PMMA), and functions to flatten a step that has occurred on the lower layer side with respect to itself. The flattening film 23 has a larger film thickness than that of each of the insulating films 17, 19, 21, 24, 26, and 28 composed of the above-described inorganic material, and the film thickness is preferably approximately 1.5 μm to 3 μm, for example. However, the present invention is not limited to this. The semiconductor film 18 is composed of a thin film using an oxide semiconductor or amorphous silicon, for example, as a material, and composes a channel (semiconductor) 10/4 connected to the source electrode 10/2 and the drain electrode 10/3 in the TFT 10f, for example. The first transparent electrode film 27 and the second transparent electrode film 29 are each composed of a transparent electrode material (e.g., ITO (indium tin oxide)), and are each disposed in the display region AA and the non-display region NAA. Out of them, the first transparent electrode film 27 and the second transparent electrode film 29 respectively compose the pixel electrode 10g, a wiring connection portion 36 and a terminal overlapping portion 41, described below, and the like and the common electrode 10h (the touch electrode 14), a second terminal overlapping portion 42, described below, and the like.

Respective configurations of the TFT 10f and the pixel electrode 10g will be described in detail. The TFT 10f includes the gate electrode 10/1 branching off from the gate line 10i composed of the second metal film 20, as illustrated in FIG. 2 and FIG. 3. The gate electrode 10/1 is formed by protruding a portion, intersecting the source line 10j, in the gate line 10i toward the pixel electrode 10g to be a connection target in the Y-axis direction. The TFT 10f includes the source electrode 10/2 composed of a portion adjacent to the gate electrode 10/1 in the X-axis direction in the source line 10j composed of the third metal film 22 and overlapping the channel 10/4 in a planar view, described below. The TFT 10f includes the drain electrode (pixel connection electrode) 10/3 disposed at a position spaced apart from the source electrode 10/2 and composed of the third metal film 22. The drain electrode 10/3 has its one end side connected to the channel 10/4 by overlapping the channel 10/4 in a planar view in an opposite shape to the source electrode 10/2 while having its other end side connected to the pixel electrode 10g. The TFT 10f includes the channel 10/4 overlapping the gate electrode 10/1 in a planar view with the gate insulating film 19 interposed therebetween while being connected to the source electrode 10/2 and the drain electrode 10/3 and composed of the semiconductor film 18. At respective positions, overlapping the source electrode 10/2 and the drain electrode 10/3, in the gate insulating film 19 and the second interlayer insulating film 21 each interposed between the channel 10/4 and the source and drain electrodes 10/2 and 10/3, channel contact holes 13 are provided in forms opening thereto, and the source electrode 10/2 and the drain electrode 10/3 are respectively connected to the channel 10/4 via the channel contact holes 13. The channel 10/4 extends in the X-axis direction in a form intersecting the gate electrode 10/1, and has its one end side and its other end side respectively connected to the source electrode 10/2 and the drain electrode 10/3. On the layer side with respect to the channel 10/4, the TFT light shielding portion 30 composed of the first metal film 16 is arranged to overlap the lower layer side. When the TFT light shielding portion 30 mainly blocks light irradiated from the backlight device, the light can be inhibited from being incident on the channel 10/4. Accordingly, a characteristic of the TFT 10f can be stabilized. The TFT 10f is of a so-called top gate type because the gate electrode 10/1 is disposed on the upper layer side of the channel 10/4.

The pixel electrode 10g composed of the first transparent electrode film 27 has its portion overlapping a large part of the TFT 10f in a planar view, as illustrated in FIG. 2 and FIG. 3, while the overlapping portion is connected to the other end side (a portion) of the drain electrode 10f3. The respective overlapping portions of the pixel electrode 10g composed of the first transparent electrode film 27 and the drain electrode 10f3 composed of the third metal film 22 are connected to each other via pixel contact holes 31 respectively formed to open to the flattening film 23, the third interlayer insulating film 24, and the fourth interlayer insulating film 26 interposed therebetween. The pixel contact holes 31 are disposed in forms each overlapping both the pixel electrode 10g and the drain electrode 10f3 in a planar view while being respectively formed to penetrate the flattening film 23, the third interlayer insulating film 24, and the fourth interlayer insulating film 26. When the TFT 10f is driven based on a scanning signal to be fed to the gate electrode 10f1 from the gate line 10i, a potential related to an image signal fed to the source line 10j is fed to the drain electrode 10f3 from the source electrode 10f2 via the channel 10f4, thereby to charge the pixel electrode 10g.

Then, the touch wiring 15 will be described in detail. The touch wiring 15 extends in a form in parallel with the source line 10j and is disposed in a form overlapping the source line 10j in a planar view in the interior space 10IS and the display region AA in the liquid crystal panel 10, as illustrated in FIG. 2 and FIG. 3. The touch wiring 15 is composed of the fourth metal film 25, and is insulated from the source line 10j by the flattening film 23 and the third interlayer insulating film 24 being interposed between the touch wiring 15 and the source line 10j overlapping itself. The touch wiring 15 composed of the fourth metal film 25 is connected to the touch electrode 14 composed of the second transparent electrode film 29 to be a connection target via touch contact holes (position detection contact holes) 32 respectively formed to open to the fourth interlayer insulating film 26 and the fifth interlayer insulating film 28 interposed therebetween. The touch contact holes 32 are each arranged to overlap the touch electrode 14 and the touch wiring 15 in a planar view, and are respectively formed in forms penetrating the fourth interlayer insulating film 26 and the fifth interlayer insulating film 28. Further, a pad electrode 33 composed of the first transparent electrode film 27 is provided at a position overlapping the touch contact holes 32 in a planar view. The pad electrode 33 has an island shape one size larger than the touch contact holes 32 and separated from and independent of the pixel electrode 10g, and is connected to a portion of the touch wiring 15 on the lower layer side and a portion of the touch electrode 14 on the upper layer side, respectively, via the touch contact holes 32. That is, the pad electrode 33 is disposed in a form interposed between the touch electrode 14 on the upper layer side and the touch wiring 15 on the lower layer side. Therefore, a step that can occur in the touch electrode 14 more decreases and thus a connection state between the touch electrode 14 and the touch wiring 15 becomes better than when a configuration in which a touch electrode is directly connected to a touch wiring has been adopted. The touch wiring 15 extends substantially in the Y-axis direction in a form intersecting all the touch electrodes 14, but is selectively connected to only the specific touch electrode 14 by a planar arrangement of the touch contact holes 32.

On the other hand, in the non-display region NAA outside the interior space 10IS in the liquid crystal panel 10, the touch wiring 15 is led around in a substantially fan shape, as illustrated in FIG. 1, and its lead-out distal end portion is connected to a portion of the touch lead-out wiring (lead-out wiring) 34. The touch lead-out wiring 34 is composed of the third metal film 22, is led around in a substantially fan shape in a form in parallel with the touch wiring 15 in the non-display region NAA, and has its one end side and its other end side respectively connected to the touch wiring 15 and the driver 11. A terminal 35 to be electrically connected to a terminal (not illustrated) on the side of the driver 11 via an anisotropic conductive film (ACF: not illustrated) or the like is provided on the other end side of the touch lead-out wiring 34. The terminal 35 will be described in detail below. The source line 10j is also connected to the driver 11 via a source lead-out wiring not illustrated, like the touch wiring 15, and the source lead-out wiring is composed of the first metal film 16 or the second metal film 20, for example.

In the present embodiment, the fourth metal film 25 is patterned using the dry etching method to form the touch wiring 15 in a process for producing the array substrate 10b. The dry etching method is suitable for a case where the film thickness of the fourth metal film 25 is large and a case where the line width of the touch wiring 15 to be formed is very small. As a result, a wiring resistance of the touch wiring 15 can be made lower, and thus a touch sensitivity becomes better. When the fourth metal film 25 is thus patterned using the dry etching method, if the array substrate 10b is configured such that the flattening film 23 is disposed on the lower layer side of the fourth metal film 25, the flattening film 23 composed of an organic material is etched so that surface flatness of the array substrate 10b is lost. As a result, the thickness of the liquid crystal layer 10c may be uneven, or a liquid crystal material composing the liquid crystal layer 10c may be locally insufficient. In the present embodiment, the third interlayer insulating film 24 is disposed on the upper layer side of the flattening film 23, and the third interlayer insulating film 24 is disposed in a form interposed between the flattening film 23 and the fourth metal film 25. In this way, when the fourth metal film 25 is patterned using the dry etching method, the flattening film 23 is covered with the third interlayer insulating film 24 composed of an inorganic material. Therefore, the third interlayer insulating film 24 can be made to function as an etching stopper for the flattening film 23. As a result, the flattening film 23 is avoided being etched so that the surface flatness of the array substrate 10b is ensured. On the other hand, when the touch wiring 15 composed of the fourth metal film 25 and the touch lead-out wiring 34 composed of the third metal film 22 are connected to each other, if a configuration in which a portion of the touch wiring and a portion of the touch lead-out wiring are made to overlap each other and a contact hole is drilled through the flattening film 23 and the third interlayer insulating film 24 at the overlapping position to directly connect the touch wiring and the touch lead-out wiring to each other is adopted, a dedicated photomask for patterning the third interlayer insulating film 24 is required so that a production cost may be increased.

According to the configuration, the lead-out distal end portion (portion) of the touch wiring 15 according to the present embodiment is connected to the one end side (portion) of the touch lead-out wiring 34 via the wiring connection portion 36, as illustrated in FIG. 4. More specifically, both the lead-out distal end portion of the touch wiring 15 and the one end side of the touch lead-out wiring 34 are each arranged to overlap the wiring connection portion 36 in a planar view, although arranged not to overlap each other in a planar view. The wiring connection portion 36 is composed of the first transparent electrode film 27, extends from a position overlapping the lead-out distal end portion of the touch wiring 15 to a position overlapping the one end side of the touch lead-out wiring 34, and has its one end side and its other end side respectively overlapping the lead-out distal end portion of the touch wiring 15 and the one end side of the touch lead-out wiring 34. At a position overlapping both the lead-out distal end portion of the touch wiring 15 composed of the fourth metal film 25 and the one end side of the wiring connection portion 36 composed of the first transparent electrode film 27 in a planar view, a first wiring contact hole 37 is drilled through the fourth interlayer insulating film 26 interposed between the touch wiring 15 and the wiring connection portion 36. The first wiring contact hole 37 is formed in a form penetrating the fourth interlayer insulating film 26, to connect the lead-out distal end portion of the touch wiring 15 arranged to overlap itself and the one end side of the wiring connection portion 36 to each other. At respective positions, overlapping both the other end side of the wiring connection portion 36 composed of the first transparent electrode film 27 and the one end side of the touch lead-out wiring 34 composed of the third metal film 22 in a planar view, in the flattening film 23, the third interlayer insulating film 24, and the fourth interlayer insulating film 26 interposed between the wiring connection portion 36 and the touch lead-out wiring 34, second wiring contact holes 38 are provided in forms opening thereto. The second wiring contact holes 38 are respectively formed in forms penetrating the flattening film 23, the third interlayer insulating film 24, and the fourth interlayer insulating film 26, to connect the other end side of the wiring connection portion 36 arranged to overlap itself and the one end side of the touch lead-out wiring 34.

According to the above-described configuration, the touch wiring 15 and the touch lead-out wiring 34 are connected to each other in a form relayed by the wiring connection portion 36 via the first wiring contact hole 37 and the second wiring contact holes 38 while a contact hole in a form not opening the fourth interlayer insulating film 26 but opening the flattening film 23 and the third interlayer insulating film 24 is not provided, as illustrated in FIG. 4. That is, both the first wiring contact hole 37 and the second wiring contact holes 38 open the fourth interlayer insulating film 26, and in this respect, are common to the pixel contact holes 31 provided in forms opening to respective portions, overlapping the other end side of the drain electrode 10fβ composed of the third metal film 22 in the TFT 10f and the portion of the pixel electrode 10g composed of the first transparent electrode film 27, in the flattening film 23, the third interlayer insulating film 24, and the fourth interlayer insulating film 26. Therefore, the first wiring contact hole 37 and the second wiring contact holes 38 can be provided using a photomask used to pattern the fourth interlayer insulating film 26 to provide the pixel contact holes 31 in a process for producing the array substrate 10b. That is, if the photomask is used, the pixel contact holes 31, the first wiring contact hole 37, and the second wiring contact holes 38 can be collectively provided in a form communicating with at least the fourth interlayer insulating film 26 and the third interlayer insulating film 24 on the lower layer side thereof. As described above, the pixel contact holes 31, the first wiring contact hole 37, and the second wiring contact holes 38 can be provided using the photomask for patterning the fourth interlayer insulating film 26, and a dedicated photomask for patterning the third interlayer insulating film 24 is not required, which is suitable for reducing a production cost. A portion of the touch wiring 15 composed of the fourth metal film 25 is disposed at a position overlapping the first wiring contact hole 37 in a planar view. When the touch wiring 15 functions as an etching stopper for the flattening film 23 and the third interlayer insulating film 24, the first wring contact hole 37 in a form penetrating only the third interlayer insulating film 24 can be provided.

Then, the terminal 35 will be described in detail. The terminal 35 is provided at an end, as illustrated in FIG. 4, on the opposite side to the side of the wiring connection portion 36, in the touch lead-out wiring 34, and is arranged to overlap the driver 11 (see FIG. 1) as a connection target in a planar view. The same number of terminals 35 as the respective numbers of touch wirings 15 and touch lead-out wirings 34 to be installed are arranged side by side in the X-axis direction in a mounting region of the driver 11 in the non-display region NAA in the array substrate 10b. The terminal 35 is a part of the touch lead-out wiring 34, and thus is composed of the third metal film 22. Accordingly, at respective positions, overlapping at least the terminal 35 in a planar view, in the flattening film 23, the third interlayer insulating film 24, and the fourth interlayer insulating film 26 disposed on the upper layer side with respect to the third metal film 22, terminal holes 39 are provided in forms opening thereto. Further, at a position overlapping the terminal 35 in a planar view, a second terminal hole 40 is drilled through the fifth interlayer insulating film 28 disposed on the upper layer side with respect to the fourth interlayer insulating film 26. When the terminal 35 composed of the third metal film 22 is made to face the terminal holes 39 and the second terminal hole 40, the terminal 35 can be connected to the terminal on the side of the driver 11. Among the terminal holes 39 respectively provided in the flattening film 23, the third interlayer insulating film 24, and the fourth interlayer insulating film 26, the terminal holes 39 respectively provided in the third interlayer insulating film 24 and the fourth interlayer insulating film 26 are provided in forms overlapping each of the plurality of terminals 35 in a planar view while the terminal hole 39 provided in the flattening film 23 is provided in a form collectively overlapping the plurality of terminals 35 in a planar view. That is, the flattening film 23 is removed over an entire area from a position near the terminal 35 with respect to the second wiring contact holes 38 to an end position on the side of the terminal 35 in the Y-axis direction in the array substrate 10b. The terminal holes 39 respectively included in the third interlayer insulating film 24 and the fourth interlayer insulating film 26 are provided using a photomask for patterning the fourth interlayer insulating film 26, i.e., the same photomask as that used to provide the pixel contact holes 31, the first wiring contact hole 37, and the second wiring contact holes 38.

The terminal overlapping portion 41 composed of the first transparent electrode film 27 is provided, as illustrated in FIG. 4, at a position overlapping the terminal 35 and the terminal holes 39 in a planar view. The terminal overlapping portion 41 is connected to the terminal 35 via the terminal holes 39 overlapping itself. Further, the second terminal overlapping portion 42 composed of the second transparent electrode film 29 is provided at a position overlapping the terminal 35, the terminal hole 39, and the second terminal hole 40 in a planar view. The second terminal overlapping portion 42 is connected to the terminal overlapping portion 41 via the second terminal hole 40 overlapping itself. If the terminal overlapping portion and the second terminal overlapping portion are not formed, the terminal 35 is directly exposed to the outside via the terminal holes 39 and the second terminal hole 40. Therefore, the terminal 35 may be etched when the first transparent electrode film 27 is patterned, for example. According to the configuration, the terminal overlapping portion 41 is connected to the terminal 35 via the terminal holes 39. Therefore, when the first transparent electrode film 27 is patterned, the terminal 35 can be protected by the terminal overlapping portion 41, and the terminal 35 can be avoided being etched while the resistance of the terminal 35 can be reduced. Moreover, the second terminal overlapping portion 42 is connected to the terminal overlapping portion 41 via the second terminal hole 40. Therefore, the terminal 35 can be further protected by the second terminal overlapping portion 42 while the resistance of the terminal 35 can be further reduced.

As described above, the array substrate (display substrate) 10*b* according to the present embodiment includes the third metal film (first conductive film) 22, the flattening film (first insulating film) 23 disposed on the upper layer side of the third metal film 22, the third interlayer insulating film (second insulating film) 24 disposed on the upper layer side of the flattening film 23, the fourth metal film (second conductive film) 25 disposed on the upper layer side of the third interlayer insulating film 24, the fourth interlayer insulating film (third insulating film) 26 disposed on the upper layer side of the fourth metal film 25, the first transparent electrode film (third conductive film) 27 disposed on the upper layer side of the fourth interlayer insulating film 26, the TFT (switching element) 10*f* having at least the drain electrode (pixel connection electrode) 10*/3* composed of the third metal film 22, the pixel electrode 10*g* composed of the first transparent electrode film 27 and having its portion overlapping at least a portion of the drain electrode 10*/3*, the pixel contact holes 31 provided in forms opening to respective positions, overlapping the drain electrode 10*/3* and the pixel electrode 10*g*, in the flattening film 23, the third interlayer insulating film 24, and the fourth interlayer insulating film 26, the touch wiring (wiring) 15 composed of the fourth metal film 25, the wiring connection portion 36 composed of the first transparent electrode film 27 and including a portion overlapping a portion of the touch wiring 15, the first wiring contact hole 37 drilled through the fourth interlayer insulating film 26 at a position overlapping the touch wiring 15 and the wiring connection portion 36, the touch lead-out wiring (lead-out wiring) 34 composed of the third metal film 22 and including a portion overlapping a section of the wiring connection portion 36 not overlapping the touch wiring 15, and the second wiring contact holes 38 drilled through the flattening film 23 at a position overlapping the wiring connection portion 36 and the touch lead-out wiring 34, the third interlayer insulating film 24, and the fourth interlayer insulating film 26.

In this way, the third interlayer insulating film 24 is disposed in a form interposed between the flattening film 23 and the fourth metal film 25. Therefore, when the fourth metal film 25 is patterned using the dry etching method, for example, the third interlayer insulating film 24 can be made to function as an etching stopper for the flattening film 23. On the other hand, when the touch wiring 15 composed of the fourth metal film 25 and the touch lead-out wiring 34 composed of the third metal film 22 are connected to each other, if a configuration in which the portion of the touch wiring and the portion of the touch lead-out wiring are made to overlap each other and a contact hole is drilled through the flattening film 23 and the third interlayer insulating film 24 at the overlapping position to directly connect the touch wiring and the touch lead-out wiring to each other has been adopted, a dedicated photomask for patterning the third interlayer insulating film 24 is required so that a production cost may be increased.

According to the configuration, the section of the wiring connection portion 36 composed of the first transparent electrode film 27 overlaps the portion of the touch wiring 15 composed of the fourth metal film 25 while the section that does not overlap the touch wiring 15 overlaps the portion of the touch lead-out wiring 34 composed of the third metal film 22. Furthermore, the first wiring contact hole 37 is drilled through the fourth interlayer insulating film 26 at the position overlapping the touch wiring 15 and the wiring connection portion 36 and the second wiring contact holes 38 are drilled through the flattening film 23, the third interlayer insulating film 24, and the fourth interlayer insulating film 26 at the positions overlapping the wiring connection portion 36 and the touch lead-out wiring 34. Therefore, the touch wiring 15 and the touch lead-out wiring 34 are connected to each other via the wiring connection portion 36. Furthermore, this configuration does not include a contact hole that is not drilled through the fourth interlayer insulating film 26 but drilled through the flattening film 23 and the third interlayer insulating film 24. That is, the first wiring contact hole 37 and the second wiring contact holes 38 are drilled through the fourth interlayer insulating film 26. This is in common with the pixel contact holes 31 drilled through the flattening film 23, the third interlayer insulating film 24, and the fourth interlayer insulating film 26 at the positions overlapping at least the portion of the drain electrode 10*/3* composed of the third metal film 22 in the TFT 10*f* and the portion of the pixel electrode 10*g* composed of the first transparent electrode film 27. Therefore, the first wiring contact hole 37 and the second wiring contact holes 38 can be formed using a photomask used to form the pixel contact holes 31. As described above, the pixel contact holes 31, the first wiring contact hole 37, and the second wiring contact holes 38 can be formed using a photomask for patterning the fourth interlayer insulating film 26, and a dedicated photomask for patterning the third interlayer insulating film 24 is not required, which is suitable for reducing a production cost. The portion of the touch wiring 15 composed of the fourth metal film 25 is disposed at a position overlapping the first wiring contact hole 37, and the touch wiring 15 functions as an etching stopper for the flattening film 23 and the third interlayer insulating film 24.

The array substrate 10*b* includes the fifth interlayer insulating film (fourth insulating film) 28 disposed on the upper layer side of the first transparent electrode film 27, the second transparent electrode film (fourth conductive film) 29 disposed on the upper layer side of the fifth interlayer insulating film 28, the touch electrode (position detection electrode) 14 composed of the second transparent electrode film 29, having its portion overlapping a portion of the touch wiring 15, and forming an electrostatic capacitance between a finger as a position input member for performing position input and itself to detect an input position with the finger as the position input member, and the touch contact holes (position detection contact holes) 32 provided in forms opening to respective positions, overlapping the touch electrode 14 and the touch wiring 15, in the fourth interlayer insulating film 26 and the fifth interlayer insulating film 28. In this way, the touch electrode 14 composed of the second transparent electrode film 29 has its portion overlapping the portion of the touch wiring 15 composed of the fourth metal film 25, and the overlapping portions are connected to each other via the touch contact holes 32 respectively provided in forms opening to the fourth interlayer insulating film 26 and the fifth interlayer insulating film 28. As a result, the touch electrode 14 forms an electrostatic capacitance between the finger as the position input member for performing position input and itself to detect the input position with the finger as the position input member.

The array substrate 10b includes the pad electrode 33 composed of the first transparent electrode film 27 and disposed in a form overlapping the touch contact holes 32. In this way, the overlapping portions of the touch electrode 14 composed of the second transparent electrode film 29 and the touch wiring 15 composed of the fourth metal film 25 are connected to the pad electrode 33 composed of the first transparent electrode film 27, respectively, via the touch contact holes 32 respectively provided in forms opening to the fourth interlayer insulating film 26 and the fifth interlayer insulating film 28. That is, the pad electrode 33 is disposed in a form interposed between the touch electrode 14 and the touch wiring 15. Therefore, a step that can occur in the touch electrode 14 is more reduced and thus a connection state between the touch electrode 14 and the touch wiring 15 becomes better than when a configuration in which a touch electrode is directly connected to a touch wiring has been adopted.

The array substrate 10b includes the terminal 35 provided at the end, on the opposite side to the side of the wiring connection portion 36, in the touch lead-out wiring 34, the terminal holes 39 provided in forms opening to respective positions, overlapping at least the terminal 35, in the flattening film 23, the third interlayer insulating film 24, and the fourth interlayer insulating film 26, and the terminal overlapping portion 41 composed of the first transparent electrode film 27 and disposed in a form overlapping the terminal 35. In this way, the terminal overlapping portion 41 composed of the first transparent electrode film 27 is connected to the terminal 35 provided at the end, on the opposite side to the side of the wiring connection portion 36, in the touch lead-out wiring 34 via the terminal holes 39 provided in forms opening to the respective positions, overlapping at least the terminal 35, in the flattening film 23, the third interlayer insulating film 24, and the fourth interlayer insulating film 26. If the terminal overlapping portion is not formed, the terminal 35 is exposed via the terminal hole 39. Therefore, the terminal 35 may be etched when the first transparent electrode film 27 is patterned, for example. According to the configuration, the terminal overlapping portion 41 is connected to the terminal 35 via the terminal holes 39. Therefore, when the first transparent electrode film 27 is patterned, the terminal 35 can be protected by the terminal overlapping portion 41 so that the terminal 35 can be avoided being etched while the resistance of the terminal 35 can be reduced.

The array substrate 10b includes the fifth interlayer insulating film 28 disposed on the upper layer side of the first transparent electrode film 27, the second transparent electrode film 29 disposed on the upper layer side of the fifth interlayer insulating film 28, the second terminal overlapping portion 42 composed of the second transparent electrode film 29 and disposed in a form overlapping the terminal overlapping portion 41, and the second terminal hole 40 drilled through the fifth interlayer insulating film 28 at a position overlapping the terminal overlapping portion 41 and the second terminal overlapping portion 42. According to the configuration, the second terminal overlapping portion 42 composed of the second transparent electrode film 29 is connected to the terminal overlapping portion 41 composed of the first transparent electrode film 27 via the second terminal hole 40 in the fifth interlayer insulating film 28. The terminal 35 can be further protected by the second terminal overlapping portion 42 while the resistance of the terminal 35 can be further reduced.

The liquid crystal panel (display device) 10 according to the present embodiment includes the above-described array substrate 10b and the CF substrate (common substrate) 10a disposed in an opposite shape in a form having the interior space 10IS between the array substrate 10b and itself. According to the liquid crystal panel 10 having such a configuration, the production cost of the array substrate 10b is reduced so that excellent cost competitiveness is obtained.

Second Embodiment

A second embodiment of the present invention will be described with reference to FIG. 5. In the second embodiment, a wiring connection overlapping portion 43 is added while a configuration of a terminal 135 is changed. An overlapping description is omitted for a similar structure, function, and effect to those in the above-described first embodiment.

Figure 5:
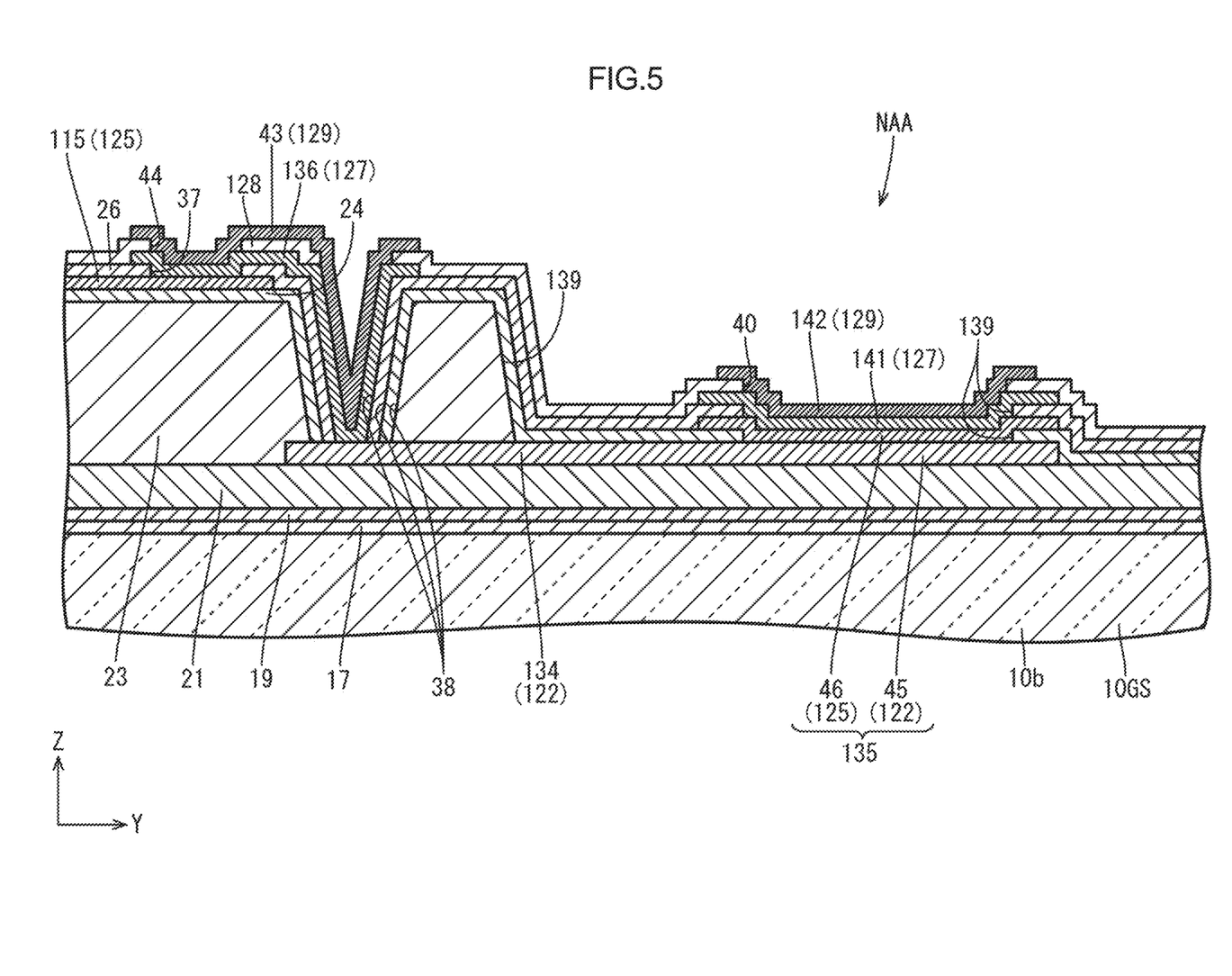
FIG. 5 is a cross-sectional view illustrating a connection portion between a touch wiring and a touch lead-out wiring in an array substrate according to a second embodiment of the present invention.

A wiring connection portion 136 according to the present embodiment is provided with the wiring connection overlapping portion 43 composed of a second transparent electrode film 129 in a form overlapping itself, as illustrated in FIG. 5. The wiring connection overlapping portion 43 has a formation range a substantially entire area of which overlaps the wiring connection portion 136 in a planar view, and extends from a position, overlapping a lead-out distal end portion of a touch wiring 115 to a position overlapping one end side of a touch lead-out wiring 134. At a position, overlapping the wiring connection overlapping portion 43 and the wiring connection portion 136, in a fifth interlayer insulating film 128 interposed between the wiring connection overlapping portion 43 and the wiring connection portion 136, a third wiring contact hole 44 is provided in a shape opening thereto. Therefore, the wiring connection overlapping portion 43 is connected to the wiring connection portion 136 via the third wiring contact hole 44. As a result, the resistance of the wiring connection portion 136 is reduced while the wiring connection portion 136 is protected so that the wiring connection portion 136 is not easily corroded.

On the other hand, the terminal 135 includes a first terminal portion 45 composed of an end, on the opposite side to the side of the wiring connection portion 136, in the touch lead-out wiring 134 composed of a third metal film 122 and a second terminal portion 46 composed of a fourth metal film 125, as illustrated in FIG. 5. The second terminal portion 46 has a formation range a substantially entire area of which overlaps a terminal overlapping portion 141 and a second terminal overlapping portion 142 in a planar view, and is arranged to be interposed between the first terminal portion 45 and the terminal overlapping portion 141 in a Z-axis direction. The second terminal portion 46 is connected to the first terminal portion 45 on the lower layer side thereof and the terminal overlapping portion 141 on the upper layer side thereof, respectively, via terminal holes 139. When the terminal 135 is thus made to have a stacked structure including the first terminal portion 45 composed of the third metal film 122 and the second terminal portion 46 composed of the fourth metal film 125, the resistance of the terminal 135 can be further reduced.

As described above, according to the present embodiment, the terminal 135 includes the first terminal portion 45 composed of the end, on the opposite side to the side of the wiring connection portion 136, in the touch lead-out wiring 134 and the second terminal portion 46 composed of the fourth metal film 125, disposed in a form overlapping the first terminal portion 45, and connected to the first terminal portion 45 via the terminal hole 139. In this way, the first terminal portion 45 composed of the third metal film 122 and the second terminal portion 46 composed of the fourth metal film 125 constitute the terminal 135. Therefore, the resistance of the terminal 135 can be further reduced.

The array substrate 10b includes the fifth interlayer insulating film 128 disposed on the upper layer side of a first transparent electrode film 127, the second transparent electrode film 129 disposed on the upper layer side of the fifth interlayer insulating film 128, the wiring connection overlapping portion 43 composed of the second transparent electrode film 129 and having at least its portion disposed in a form overlapping the wiring connection portion 136, and the third wiring contact hole 44 drilled through the fifth interlayer insulating film 128 at a position overlapping the wiring connection portion 136 and the wiring connection overlapping portion 43. According to the configuration, the wiring connection overlapping portion 43 composed of the second transparent electrode film 129 has at least its portion connected to the wiring connection portion 136 composed of the first transparent electrode film 127 via the third wiring contact hole 44 provided in the fifth interlayer insulating film 128. The resistance of the wiring connection portion 136 is reduced by the wiring connection overlapping portion 43 while the wiring connection portion 136 is not easily corroded.

Other Embodiment

The present invention is not limited to the embodiments described by the above-described description and drawings, but embodiments, described below, for example, are included in the scope of the present invention.

(1) Although a case where the touch lead-out wiring is composed of only the third metal film has been illustrated in each of the above-described embodiments, a touch lead-out wiring may be composed of a third metal film and another metal film (any one of a first metal film, a second metal film, and a fourth metal film). In the case, a portion composed of the third metal film in the touch lead-out wiring and a portion composed of the other metal film in the touch lead-out wiring may be made to partially overlap each other, and a contact hole may be formed to open in an insulating film interposed between the overlapping portions to connect the overlapping portions to each other.

(2) Although a case where the touch wiring is arranged to overlap the source line has been illustrated in each of the above-described embodiments, a part or the whole of a touch wiring may be arranged to overlap a source line.

(3) Although a case where the terminal overlapping portion composed of the first transparent electrode film and the second terminal overlapping portion composed of the second transparent electrode film are provided has been illustrated in each of the above-described embodiments, either one or both of a terminal overlapping portion and a second terminal overlapping portion can also be omitted.

(4) Although a case where the pixel electrode is provided with the orientation control hole has been illustrated in each of the above-described embodiments, a common electrode may be provided with an orientation control hole. The number of orientation control holes overlapping one pixel electrode can be appropriately changed. A specific planar shape of the orientation control hole can be appropriately changed.

(5) Although a case where the flattening film is a single layer film composed of an organic material has been illustrated in each of the above-described embodiments, a flattening film may be composed of a stacked film of an organic material and an inorganic material.

(6) Although a case where the portion, overlapping the pixel contact hole, in the common electrode opens has been illustrated in each of the above-described embodiments, a portion, overlapping a pixel contact hole, in a common electrode may not open.

(7) In addition to the illustrated configuration in each of the above-described embodiments, an arrangement, a size, a planar shape, and the like of a TFT and a pixel electrode, for example, in an array substrate can be appropriately changed.

(8) Although the top gate-type TFT has been illustrated as an example in each of the above-described embodiments, a bottom gate-type TFT in which a gate electrode is disposed on the lower layer side of a channel may be provided.

(9) Although an oxide semiconductor and amorphous silicon have been illustrated as a material for the semiconductor film in each of the above-described embodiments, polysilicon can also be used as a material for a semiconductor film.

(10) Although a case where the touchscreen panel pattern is of a self-capacitance type in each of the above-described embodiments, a touchscreen panel pattern may be of a mutual capacitance type.

(11) Although a transmission type liquid crystal panel has been illustrated as an example in each of the above-described embodiments, the present invention is also applicable to a reflection type liquid crystal panel and a semi-transmission type liquid crystal panel.

(12) Although a case where the planar shape of the liquid crystal display device (the liquid crystal panel or the backlight device) is a vertically long rectangle has been illustrated in each of the above-described embodiments, a planar shape of a liquid crystal display device may be a horizontally long rectangle, a square, a circle, a semi-circle, an oval, an ellipse, a trapezoid, or the like.

(13) Although the liquid crystal panel configured such that the liquid crystal layer is sandwiched between the pair of substrates has been illustrated as an example in each of the above-described embodiments, the present invention is also applicable to a display panel in which functional organic molecules other than a liquid crystal material are sandwiched between a pair of substrates.

EXPLANATION OF SYMBOLS

10: Liquid crystal panel (display device)
10a: CF substrate (common substrate)
11: Array substrate (display substrate)
10f: TFT (switching element)
10f3: Drain electrode (pixel connection electrode)
10g: Pixel electrode
10IS: Interior space
14: Touch electrode (position detection electrode)
15, 115: Touch wiring (wiring)
22, 122: Third metal film (first conductive film)
23: Flattening film (first insulating film)
24: Third interlayer insulating film (second insulating film)
25, 125: Fourth metal film (second conductive film)
26: Fourth interlayer insulating film (third insulating film)
27, 127: First transparent electrode film (third conductive film)
28, 128: Fifth interlayer insulating film (fourth insulating film)
29, 129: Second transparent electrode film (fourth conductive film)
31: Pixel contact hole
32: Touch contact hole (position detection contact hole)

33: Pad electrode
34, 134: Touch lead-out wiring (lead-out wiring)
35, 135: Terminal
36, 136: Wiring connection portion
37: First wiring contact hole
38: Second wiring contact hole
39, 139: Terminal hole
40: Second terminal hole
41, 141: Terminal overlapping portion
42, 142: Second terminal overlapping portion
43: Wiring connection overlapping portion
44: Third wiring contact hole
45: First terminal portion
46: Second terminal portion

The invention claimed is:

1. A display substrate comprising:
a first conductive film;
a first insulating film disposed on an upper layer side of the first conductive film;
a second insulating film disposed on an upper layer side of the first insulating film;
a second conductive film disposed on an upper layer side of the second insulating film;
a third insulating film disposed on an upper layer side of the second conductive film;
a third conductive film disposed on an upper layer side of the third insulating film;
a switching element including at least a pixel connection electrode composed of the first conductive film;
a pixel electrode composed of the third conductive film and including a portion overlapping at least a portion of the pixel connection electrode;
a pixel contact hole drilled through the first insulating film, the second insulating film, and the third insulating film at a position overlapping the pixel connection electrode and the pixel electrode;
a wiring composed of the second conductive film;
a wiring connection portion composed of the third conductive film and including a portion overlapping a portion of the wiring;
a first wiring contact hole drilled through the third insulating film at a position overlapping the wiring and the wiring connection portion;
a lead-out wiring composed of the first conductive film and including a portion overlapping a section of the wiring connection portion not overlapping the wiring; and
a second wiring contact hole drilled through the first insulating film, the second insulating film, and the third insulating film at a position overlapping the wiring connection portion and the lead-out wiring.

2. The display substrate according to claim 1, further comprising:
a fourth insulating film disposed on an upper layer side of the third conductive film;
a fourth conductive film disposed on an upper layer side of the fourth insulating film;
a position detection electrode composed of the fourth conductive film and including a portion overlapping a portion of the wiring, the position detection electrode being configured to form an electrostatic capacitance between a position input member for performing position input and the position detection electrode for detection of a position of input by the position input member; and
a position detection contact hole drilled through the third insulating film and the fourth insulating film at a position overlapping the position detection electrode and the wiring.

3. The display substrate according to claim 2, further comprising a pad electrode composed of the third conductive film and disposed to overlap the position detection contact hole.

4. The display substrate according to claim 1, further comprising:
a terminal disposed at an end of the lead-out wiring on an opposite side to a side of the wiring connection portion;
a terminal hole drilled through the first insulating film, the second insulating film, and the third insulating film at a position overlapping at least the terminal; and
a terminal overlapping portion composed of the third conductive film and disposed to overlap the terminal.

5. The display substrate according to claim 4, further comprising:
a fourth insulating film disposed on an upper layer side of the third conductive film,
a fourth conductive film disposed on an upper layer side of the fourth insulating film,
a second terminal overlapping portion composed of the fourth conductive film and disposed to overlap the terminal overlapping portion; and
a second terminal hole drilled through the fourth insulating film at a position overlapping the terminal overlapping portion and the second terminal overlapping portion.

6. The display substrate according to claim 4, wherein the terminal includes a first terminal portion at an end of the lead-out wiring on an opposite side to the wiring connection portion and a second terminal portion composed of the second conductive film, disposed to overlap the first terminal portion, and connected to the first terminal portion via the terminal hole.

7. The display substrate according to claim 1, further comprising:
a fourth insulating film disposed on an upper layer side of the third conductive film;
a fourth conductive film disposed on an upper layer side of the fourth insulating film;
a wiring connection overlapping portion composed of the fourth conductive film and including a portion disposed to overlap the wiring connection portion; and
a third wiring contact hole drilled through the fourth insulating film at a position overlapping the wiring connection portion and the wiring connection overlapping portion.

8. A display device comprising:
the display substrate according to claim 1; and
a common substrate opposed to the display substrate with an interior space between the display substrate and the common substrate.

* * * * *